INVENTOR
BORIS OSMAN

NEUTRAL

FORWARD

LOCK

REVERSE

INVENTOR
BORIS OSMAN

Jan. 16, 1968

B. OSMAN 3,363,483
AUTOMATIC INFINITELY VARIABLE MECHANICAL
POWER TRANSMISSION MECHANISM

Filed June 3, 1963

INVENTOR
BORIS OSMAN
BY

Jan. 16, 1968  B. OSMAN  3,363,483
AUTOMATIC INFINITELY VARIABLE MECHANICAL
POWER TRANSMISSION MECHANISM
Filed June 3, 1963  7 Sheets-Sheet 4

INVENTOR
BORIS OSMAN

INVENTOR
BORIS OSMAN
BY

Jan. 16, 1968 B. OSMAN 3,363,483
AUTOMATIC INFINITELY VARIABLE MECHANICAL
POWER TRANSMISSION MECHANISM
Filed June 3, 1963 7 Sheets-Sheet 7

INVENTOR
BORIS OSMAN

United States Patent Office 3,363,483
Patented Jan. 16, 1968

3,363,483
AUTOMATIC INFINITELY VARIABLE MECHANICAL POWER TRANSMISSION MECHANISM
Boris Osman, 22 Burke St., Oatley, New South Wales, Australia
Filed June 3, 1963, Ser. No. 285,066
Claims priority, application Australia, June 11, 1962, 18,692/62
14 Claims. (Cl. 74—752)

This invention has been devised to provide a non-slip automatic infinitely variable mechanical power transmission mechanism. More particularly the invention has been devised to provide such a mechanism using as a part thereof a sun and planet gear assembly.

Many attempts have been made to provide a sun and planet automatic infinitely variable power transmission mechanism. Such prior mechanisms have included means for applying variable weights to the planet wheels, but for various reasons such as:

(a) inability to drive in reverse through the mechanism;
(b) uneconomical weight assemblies;
(c) inability to prevent in a practical manner reversal of torque as the planet carried weights move around the planets' centres;
(d) limitation of variable transmission to substantially low speeds;

these prior mechanisms have not proved commercially practicable. The present invention overcomes these known problems and difficulties and provides a non-slip automatic infinitely variable mechanical power transmission mechanism which will operate at any speed within mechanical design limits.

Advantages over the known art including hydraulic automatic drives are:

(1) The drive is infinitely variable and automatically provides a stepless range of ratios between power input and output.
(2) For forward or reverse drive and power braking and neutral (non-drive) through the mechanism an extremely simple control alters the direction of output torque.
(3) The direction of output torque can be made permanent for either forward or reverse drive.
(4) For a drive in either direction there is no pause in power output nor torque interruption as the transmission is completely stepless.
(5) The range of ratios extends from:
(a) Input speed—Output speed zero to output speed equal to input speed.
(b) Input speed—Output speed zero. Output torque zero. NEUTRAL.
(c) Input speed—Output speed greater than input speed. OVERDRIVE.
(d) Input speed—Output speed and torque reversed. As in (a) and (c) above except when fixed according to (3) above.
(6) The mechanism is extremely compact. Normal space required in a vehicle transmission would be that occupied by the clutch/flywheel assembly in a conventional clutch/gearbox drive.
(7) The drive is entirely mechanical with no hydraulic couplings or the like.
(8) Torque multiplication and ratio selection is entirely automatic in the true sense and not controlled by any auxiliary equipment.
(9) The drive lends itself to mass productions for various uses.

In addition to the application of the automatic infinitely variable mechanical power transmission mechanism of this invention to automotive drives, it is applicable to many other fields, such as;

(a) Shock absorbing drives from electric and other motors to equipment such as conveyors, weaving machines, coil winding machines and other equipment and machines where a smooth "take-up" is required.
(b) The drive from gas turbines to road wheels or other rotatable devices where the invention will allow a small range of turbine rotor speed for a wide range of output shaft speed which will be dependent on load requirements.
(c) Drive from a prime mover for railway and armoured fighting vehicles (tanks, troop carriers) allowing smooth power transmission.
(d) Anti-vibration drive for ships—to replace fluid couplings or other devices for the reduction of vibration conditions in propeller shafts connected, for example, to slow speed I.C. engines.
(e) The drive to cranes, hoists and the like.
(f) Differential drives to two output components to overcome slip by one of the output components permitting the other output component to remain stationary.

(10) The mechanism of this invention comprises:
(a) A main carrier connected to a power input (drive) shaft for balanced rotation therewith;
(b) A gang of main planet wheels on fixed axes on a common pitch circle in the main carrier and rotatable with the main carrier;
(c) An output shaft arranged axially with the main carrier;
(d) A main sun wheel fixed on the output shaft and engaging the main planet wheels;
(e) A sub-carrier fixed directly or indirectly to each main planet wheel;
(f) A gang of out-of-balance weight units mounted directly or indirectly on each sub-carrier;
(g) Control means to move the out-of-balance weight units angularly relative to the axes of the respective main planet wheels to establish a neutral (non-drive) position or to positions where on rotation of the main carrier centrifugal force developed through the out-of-balance weight units creates a forward drive or a reverse drive of the output shaft according to the angular position of the out-of-balance weight units. The forward drive position may be set to permit an overdrive or it may be set to prevent overdrive. For a permanent drive in one direction the means (g) are constructed to fix the angular operative position of the out-of-balance weights.

Various forms of out-of-balance weight units can be devised to transmit centrifugal force to the sun wheel through the main planet wheels. One such unit comprises:

(h) A gang of sub-planet wheels mounted on journal pins in each sub-carrier (e); each sub-planet wheel having an out-of-balance weight thereon;
(i) A sub sun wheel for each gang of sub-planet wheels mounted co-axially with each main planet wheel (b); the out-of-balance weights being adapted to be fixed by the control means (g) moving the sub sun wheels whereby determined angular positions of the out-of-balance weights on the sub-planet wheels in relation to the main planet wheels (b) can be fixed.

Another form of out-of-balance weight unit comprises:
(j) An eccentric mounted in each of the sub carriers (e) and an arrangement of articulated links connected to a strap on each eccentric and to journal pins mounted in a common pitch circle on the respective sub carriers (e). The link components constitute the weights and they are adapted to be fixel by the means (g) in determined angular positions in relation to the main planet wheels (b).

Still another form of out-of-balance weight unit is:
(k) An arrangement of articulated weight links connected to a strap on a journal pin and connected to journal pins mounted on a common pitch circle on the respective sub carriers (e). The means (g) are arranged to move the strap carrying journal pin to fix the angular position of the weight links in relation to the main planet wheels (b).

It will be seen that the units (e) and (f) incorporating either of the out-of-balance weight units (h) and (i) or (j) or (k) constitute forms of connector units which are adapted to be rotated in the main carrier (a) to select the various drive conditions by re-orienting the sub planet units or the weight-link units. For greatest efficiency in the case of the sub planet units the radius of the out-of-balance weights is equal to or greater than the pitch circle radius of the sub planet wheels. In the case of the weight link units each link part is the same or approximately the same length and in straight alignment radially in relation to their respective sub carrier, the projection of each link unit from its mounting point on its strap is approximately twice the pitch circle radius of the fixing (pivot) point to the sub carrier.

The efficiency of each form of connector unit is substantially the same but for certain uses the units (j) or (k) may be more convenient to make.

In operation, centrifugal force acting on the out-of-balance weights in either the gangs of sub planet wheels or the gangs of eccentric weights and links provides the motive force and selective torque to effect rotation of the sun wheel through the main planet wheels and hence of the output shaft. The magnitude of the resultant centrifugal force together with the direction of action in which it is applied with respect to the centre of the main planet wheels determines the performance and the direction of performance.

Centrifugal force proportional to the square of the speed of rotation of the input shaft main carrier and sub carrier is applied to each weight in either the gang of sub planet wheels or the gang of eccentric weights and links.

The centrifugal force acts in a radial direction from the centre line of the main carrier through the centre of gravity of each weight:

(a) In the case of the gang of sub planet wheels as a lever arm from the centre of each sub planet wheel and the point of contact of the pitch circles of each sub planet wheel and the sub sun wheel.

(b) In the case of the eccentric weights and links as a lever arm from the eccentric centre and the link pivot on the sub carrier.

The resultant action of centrifugal force on the sub carrier and planet wheel and sun wheel and the output shaft is the sum of the torques produced by the action of centrifugal force on each weight in the gang of sub planet wheels or the gang of eccentric weights and links modified by the individual radii of the weights from the main carrier centre and the lever arms in (a) and (b) above.

The resultant torque on the sub carrier and planet wheel will be positive or negative or zero (clockwise or anti-clockwise or zero) depending on the setting of the control means.

This centrifugal force will depend on configuration:

(1) Directly as the radius from the centre of the sun wheel.
(2) Directly as the weight used on the planet wheel.
(3) As the square of the r.p.m. of the input shaft.

For each gang of sub planet wheels in a particular design, the turning effort provided and transferred to the sun wheel will be dependent on:

(a) The weight used on the sub planet wheels—fixed
(b) The radius of the centre of the gang of sub planet wheels from the centre of the sun wheel—fixed
(c) The configuration of the weighted gear system—fixed
(d) The ratio of main planet wheel to sun wheel—fixed
(e) The square of the speed of rotation of the input shaft—variable.

For any given requirement the total turning effort may be determined by calculating the number of main planet wheels and their gangs of sub planet wheel assemblies which are spaced equally and oriented for balance to prevent vibration.

As an alternative, the same number of main planet wheels and their gangs of sub planet wheels may be placed at a greater general radius from the centre of the system or a different ratio may be selected for the main planet sun wheel drive.

One practical form of the control means to move the out-of-balance weights (connector units) of the first two described embodiments to neutral, ahead or reverse drive which in effect orients the connector units with respect to the main planet wheels consists of:

(a) A small gear (pinion) fixed to each sub sun wheel or eccentric carrying shaft (as the case may be).
(b) A large gear concentric with the main carrier and in engagement with the pinions.
(c) A helical spline in or on a hub on the large gear in engagement with a mating helical spline on a member slidable longitudinally with respect to the main carrier and rotatable therewith.
(d) Means to move the slidable member and consequently the angular position of the connector units relative to the respective main planet wheels and means to hold the slidable member in a selected position. The pinions (a) and hence the connector units must be capable of rotation through 360° to provide all drive conditions.

The control means for the third embodiment of the invention utilises (c) and (d).

Three embodiments of the invention are now described with reference to the annexed drawings wherein.

Figure 1:
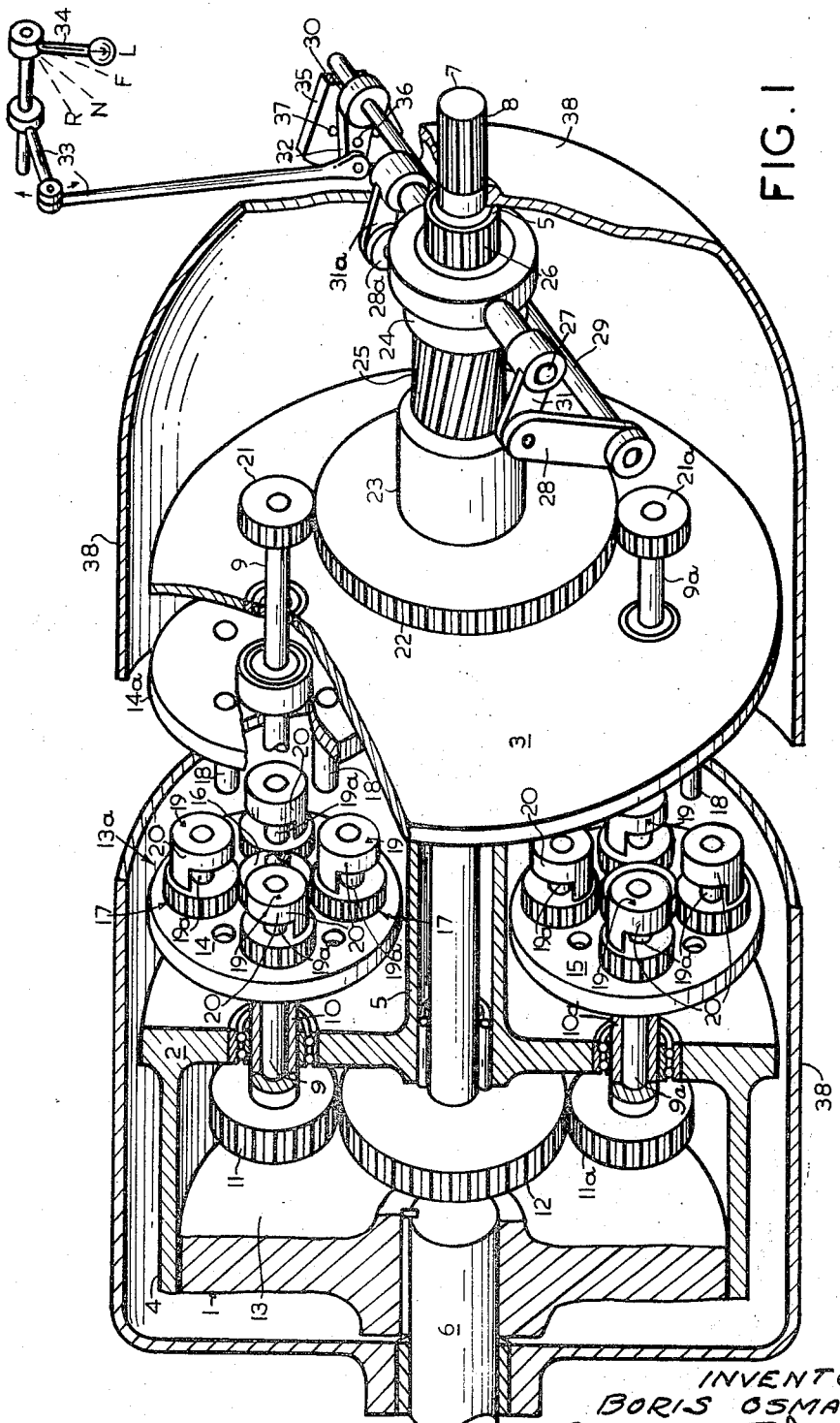
FIGURE 1 is a fragmentary perspective view partly exploded of a power transmission mechanism incorporating gangs of sub sun wheels-sub planet wheels as the connector unit including one form of selective drive control means.

Referring to FIGURE 1 the main carrier consists of three circular plates 1, 2 and 3. The plates 1 and 2 are joined together by a barrel 4 and the plate 3 is joined to the plate 2 by an axial tube 5. An input shaft 6 is fixed to the plate 1 and an output shaft 7 projects through and is supported in bearings in the tube 5. The plate 1 can, in the case of the prime mover drive, be incorporated in the fly wheel of the engine. In this case the input shaft 6 is the drive shaft of the engine and the output shaft 7 is splined as indicated at 8 or provided with other means for coupling to a driven member such as the wheels of a motor vehicle through the usual universal and differential or like mechanism.

As illustrated and for the sake of clarity only two main planet units and associated parts are shown. Any number above two may be incorporated. Two shafts 9–9a are mounted in bearings in the plates 2 and 3 on a common pitch circle. There are sleeves 10–10a on the shafts 9–9a which project into compartments 13 and 13a formed respectively between the plates 1 and 2 and 2 and 3 and they are supported in bearings in the plate 2. In the compartment 13 main planet wheels 11–11a are fixed on the respective sleeves 10–10a, for rotation therewith. The main planet wheels 11–11a are in constant mesh with a main sun wheel 12 fixed on the output shaft 7.

In the compartment 13a a sub carrier in the form of two pairs of circular plates 14–14a, 15–15a is fixed on the respective sleeves 10–10a for rotation with the main planet wheels 11–11a. The pairs of plates 14–14a, 15–15a are fixed together in spaced relationship and constitute cages for connector gears which in this embodiment consist of a sub sun wheel 16 fixed on each shaft 9–9a and a gang of four sub planet wheels 17 freely mounted on journal pins 18 fixed in and between the plates 14–14a, 15–15a respectively. Each sub planet wheel 17 has an out-of-balance weight thereon which is conveniently made as a hub 19 of the sub planet wheel having a segmental part cut away as indicated at 19a leaving an end collar 20 mounted on its journal pin 18.

The ends of the shafts 9–9a which project through the plate 3 each have a pinion 21–21a fixed thereon and engaging a gear wheel 22. This gear wheel 22 has a hub 23 with internal helical running splines therein and it is mounted on a bush 24 having complementary helical splines 25. The bush 24 is slidably mounted on the axial tube 5 preferably on straight splines as indicated at 26 and it has trunnions 27 projecting diametrically therefrom.

A pair of cranks 28–28a fixed on a shaft 29 in suitable bearings such as 30 are each connected by links 31–31a to the respective trunnions 27. A third crank 32 on the shaft 29 is connected by a rod and crank unit 33 to a hand control lever 34. The control handle can be moved to set the connector gear as above described selectively in neutral, forward, lock or reverse drive. A unit to lock the control in a selected position consists of a quadrant plate 35 fixed on one of the bearings 30 in juxtaposition to the third crank 32. A pin (not shown) with a conventional actuator is arranged to pass through a hole 36 in the crank 32 and a selected hole 37 in the quadrant plate 35. The connector gear is protected by a cover 38.

Referring to FIGURES 2, 3, 4 and 5 the out-of-balance weights on each sub planet wheel 17 as described above are, for the purpose of describing their setting, here referred to as weights 39, 40, 41 and 42. In the initial assembly of the sub planet wheels 17 the weights are located relative to the respective sub sun wheels 16 in a neutral (zero output) position. (See FIGURE 2.) In this position the weights 39 and 40 are on a common radial centre line 43 but at opposite radial positions while the weights 41 and 42 are at 90° above a centre line 44 which is at 90° to the radial centre line 43 through the weights 39–40. In this setting as the gang is rotated, the resultant force passes through the centre of the main planet wheels and there is no turning effort on the output shaft 7. This is accomplished by the two opposed weights 39–40 of the sub planet wheels 17 moving so that the effect of the individual weights produces a resultant force which passes through the centre of the main planet wheels 11–11a.

To set the out-of-balance weights for forward drive the hand control lever 34 is moved to forward drive position (see FIGURE 3), the bush 24 is moved along the tube 5 and the gear wheel 22 is turned by the helical spline assembly and turns the shafts 9–9a. The sub sun wheels 16 thus move the sub planet wheels 17 so that the weights 39 and 40 are located on a centre line 45° in advance of the radial centre line 43 still at opposite radial positions and the weights 41 and 42 are 90° in advance of the weights 39 and 40.

The resultant centrifugal force from this orientation of the weights 39, 40, 41, 42 acts at a distance from the centre of the main planet wheels 11–11a ahead with respect of the radial centre line of the main planet wheels producing a clockwise turning movement on the main planet wheels for an anticlockwise rotation of the input shaft 6 resulting in an anticlockwise rotation of the output shaft 7.

The centrifugal force of the weights on the sub planet wheels 17 for this setting acts in the same direction at any input speed and the resultant torque on the planet wheels 11–11a will be proportional to the square on the input speed and hence an infinitely variable force will be applied to the main planet wheels 11–11a and the main sun wheel 12. The actual "gear" ratio is determined by the torque available from the input shaft 6 and the torque requirement of the output shaft 7.

Overdrive is possible on the forward drive setting described above. To work from a high to overdrive the input torque available becomes greater than the torque requirement of the output shaft until a condition of balance is achieved. The system of balance works right through the variations of the drive.

Figure 2:
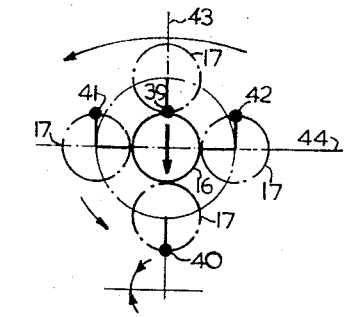
FIGURES 2, 3, 4, 5 are diagrams of a sub sun wheel-sub planet wheel assembly and show the orientation for neutral, forward, lock and reverse drives respectively.
Figure 2:
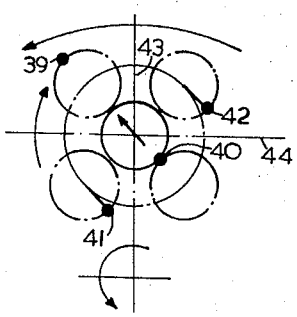
Figure 2:
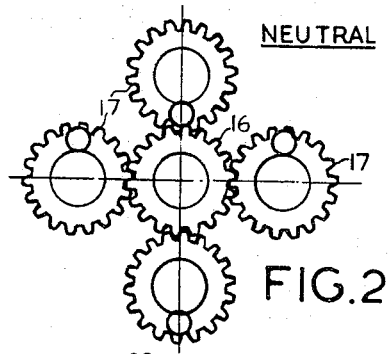

Overdrive may be prevented by moving the hand control lever 34 to move the weights 39, 40, 41, 42 (see FIGURE 4) to a position opposite to that shown in FIGURE 2, that is the sub sun wheel 16 is positioned 180° from that shown in FIGURE 2.

Figure 3:
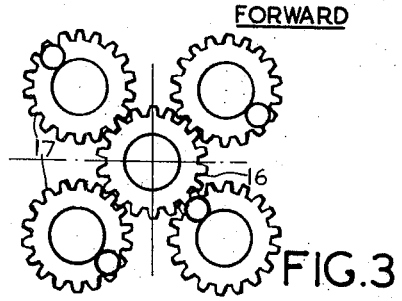
Figure 4:
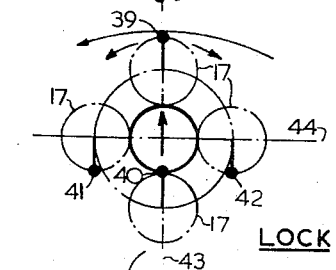
Figure 4:
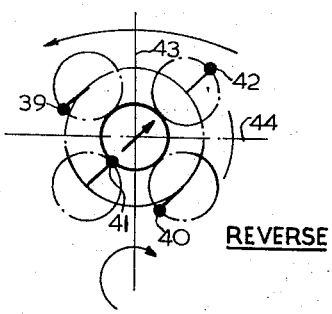
Figure 4:
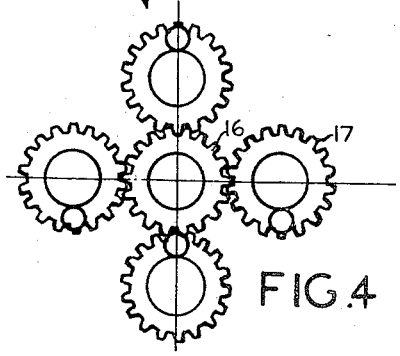
Figure 5:
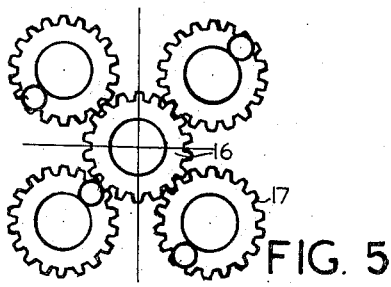
Figure 8:
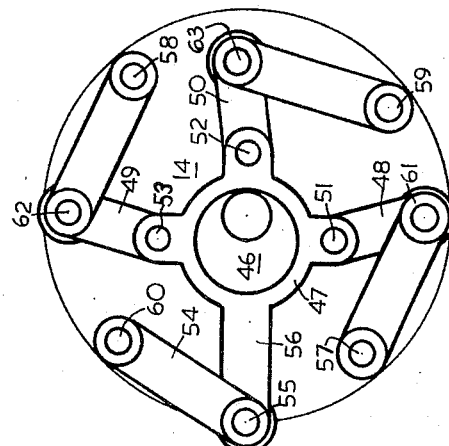
FIGURE 8 is an end diagram of one of the weight-link units shown in FIGURE 7.

For a gang of four sub planet wheels as shown in FIGURES 2, 3, 4, 5 the maximum forward and reverse torques on the sub carrier will be achieved with the sub sun wheel re-oriented by moving the hand control lever 34 to position the sub sun wheel and hence the sub planet wheels as shown in FIGURE 3 for forward drive and as shown in FIGURE 5 for reverse drive.

Figure 6:
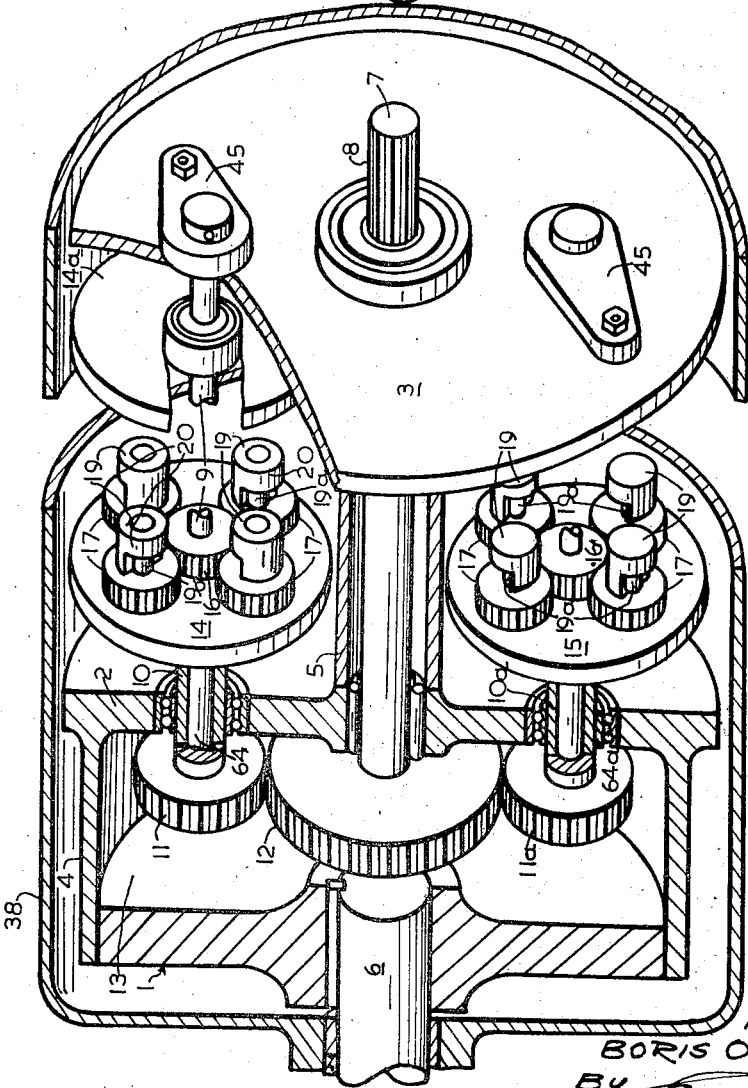
FIGURE 6 is a fragmentary perspective view similar to FIGURE 1 showing one means of fixing the connector unit of FIGURE 1 as a drive in one direction.

FIGURE 6 shows the mechanism of FIGURE 1 having in substitution for the control gear shown in FIGURE 1 means to fix the connector unit to achieve an infinitely variable power transmission in one direction. In this embodiment of the invention the gears 21 and 22 and the associated control gear are omitted. The shafts 9–9a project through the plate 3 and a locking crank 45 is secured to the respective shafts and to the plate 3 after the out-of-balance weights 19 on the sub planet wheels 17 (referred to in FIGURES 2 to 5 as weights 39 to 42) have been correctly oriented with respect to centre of the transmission. In all other respects the mechanism is the same as that shown in FIGURE 1 and the same references are used on the respective components.

Figure 7:
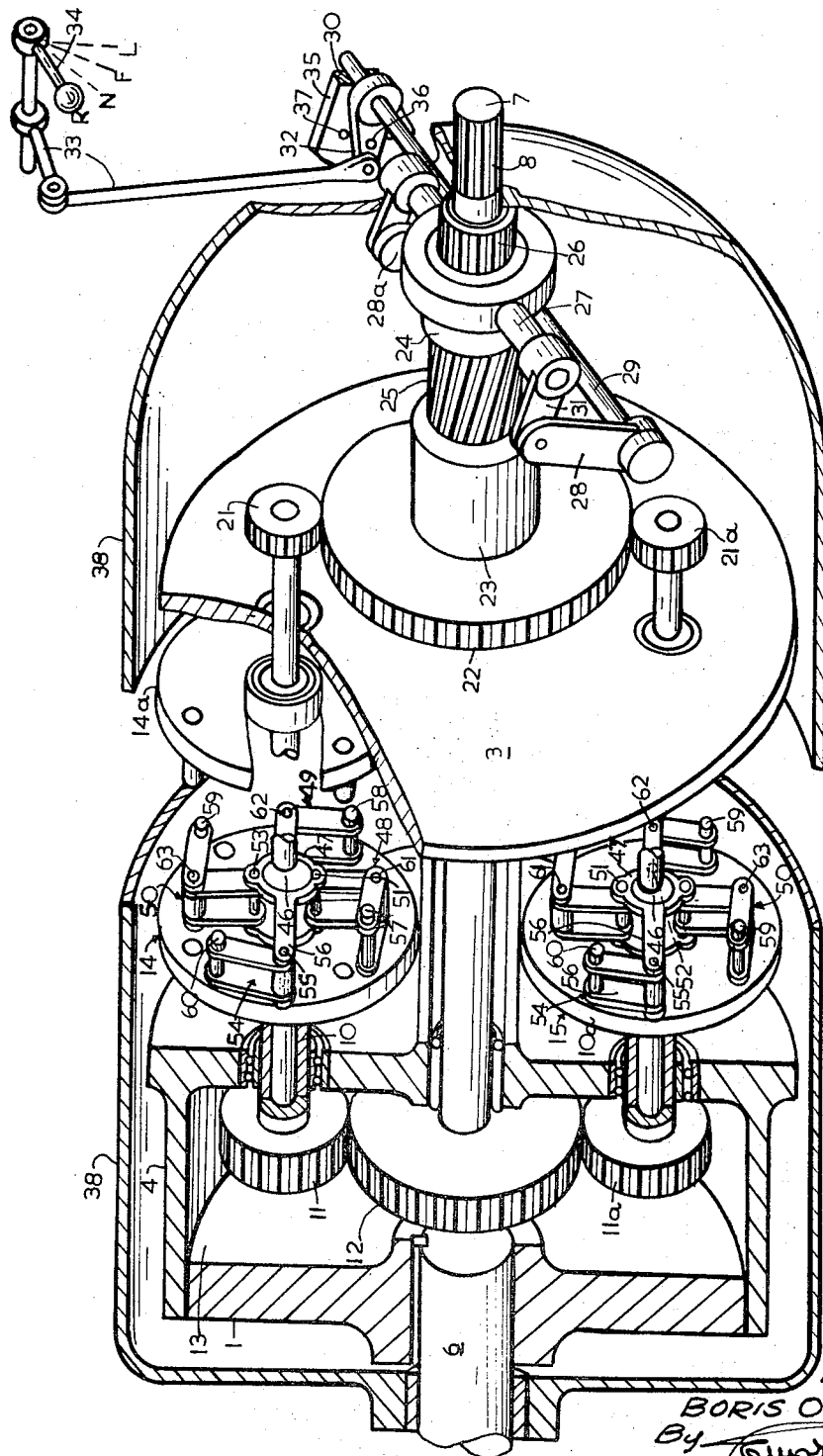
FIGURE 7 is a fragmentary perspective view partly exploded and similar to FIGURE 1 but incorporating weights and links on sub carriers in place of the sub planet-sub sun wheel assemblies.
Figure 9:
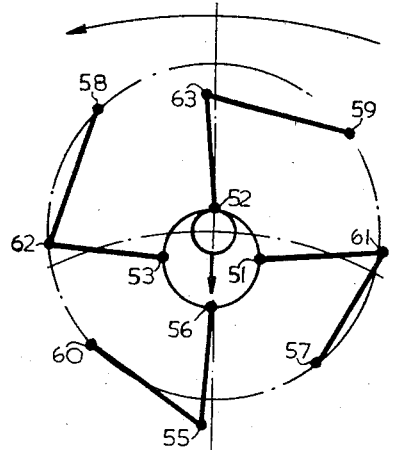
FIGURES 9, 10, 11, 12 are orientation diagrams of one of the weight-link units shown in FIGURES 7 and 8.

Referring now to FIGURE 7 the parts which are the same as the parts shown in FIGURE 1 carry the same references. In each of the sub carriers 14–14a, 15–15a an eccentric 46 is mounted on each of the shafts 9–9a. A strap 47 rotatably mounted on each eccentric 46 has three sets of two part articulated double links 48, 49, 50 secured by one end to journal pins 51, 52, 53 on the strap 47 at 90° apart and a fourth link 54 (not articulated) is secured by journal pin 55 to a radial arm 56 fixed to and projecting from the strap 47 at 90° from the links 48, 49. The other ends of all links are secured by journal pins 57, 58, 59, 60 fixed in and between the sub-carrier plates 14–14a, 15–15a respectively on a common pitch circle. The journal pins 61, 62, 63 connecting the respective articulated links and the journal pin 55 are the equivalent of and function in the same manner as the out-of-balance weights in the sub planet-sub sun wheel units. In the initial assembly the weights are located relative to the eccentric 46 (which is the equivalent of the sub sun wheel 16) in neutral (zero output) position. In this setting (see FIGURE 9) as the link weights in the sub carriers 14–14a, 15–15a are rotated the resultant centrifugal force passes through the centre of the main planet wheels 11–11a and there is no turning effect on the output shaft 7.

To set the weights-links for forward drive the hand control lever 34 is moved to forward drive position (see FIG- URE 10) the shafts 9–9a are turned (in the same manner as with the sub sun-sub planet wheels units) and turn the eccentrics 46 to a position where the "throw" of the eccentrics 46 is moved 90° in advance of the neutral position. With this orientation of the eccentric, journal pins and links the resultant of the centrifugal forces acts at a distance from the centre of the main planet wheels 11–11a ahead of the planet wheel centre producing a clockwise turning movement of the main planet wheels for an anti-clockwise rotation of the input shaft 6 resulting in an anti-clockwise rotation of the output shaft 7. The centrifugal force for this setting acts to produce the same infinitely variable force as that described with reference to the sub sun wheel-sub planet wheel units described above.

Figure 11:
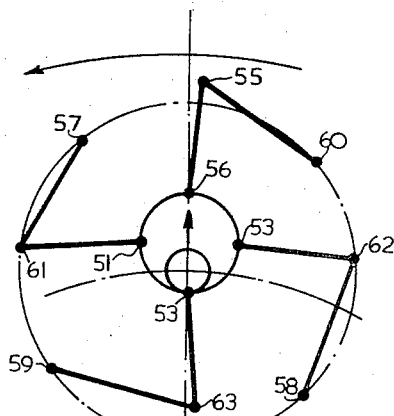

Overdrive is possible on the forward setting as previously described. It can be prevented by moving the eccentrics 46 to the position shown in FIGURE 11 which is 180° in advance of the neutral setting.

Figure 12:
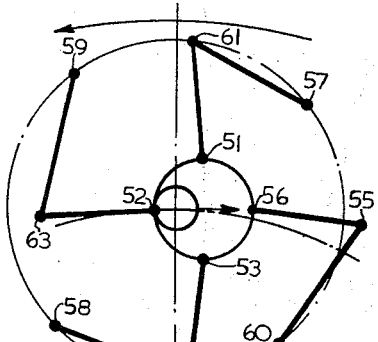

For a reverse drive the eccentrics 46 are moved to the position shown in FIGURE 12 which is at 180° behind the forward drive position.

In any gang of weighted sub planet wheels or weighted double links the actual settings are, in designing the mechanism according to any particular embodiment of the invention, predetermined by calculation, and by force and torque diagrams.

For example:

(a) For a gang of four weighted sub planet wheels (see FIGURES 1, 3, 5) the angular settings of the sub sun wheel for FORWARD and REVERSE may be approximately 90° apart.

Figure 10:
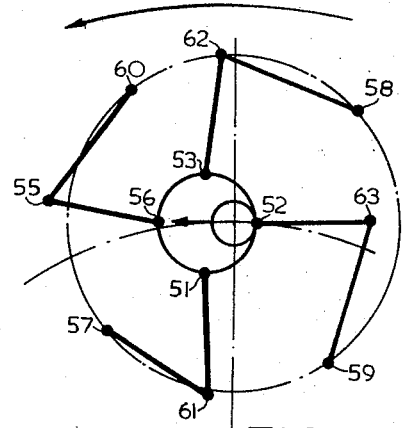

(b) For a gang of four weighted double links (see FIGURES 7, 10, 12) angular settings of the eccentric 46 for FORWARD and REVERSE may be approximately 180° apart.

Figure 14:
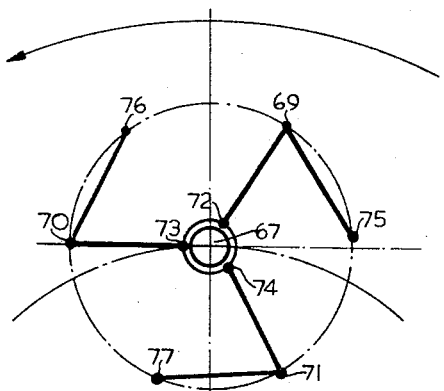
FIGURES 14, 15, 16 are orientation diagrams of one of the weight-link units shown in FIGURE 13.
Figure 15:
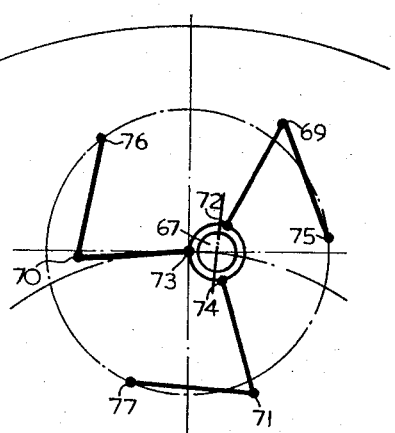
Figure 16:
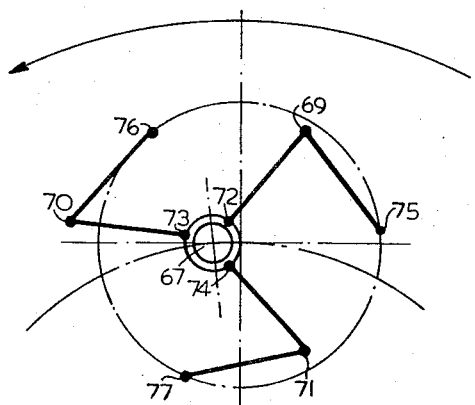

(c) For a gang of three weighted double links (see FIGURES 13, 15, 16) angular settings of the journal pins/carrier pins for FORWARD and REVERSE may be as shown in FIGURES 15 and 16. NEUTRAL is shown in FIGURE 14.

Figure 13:
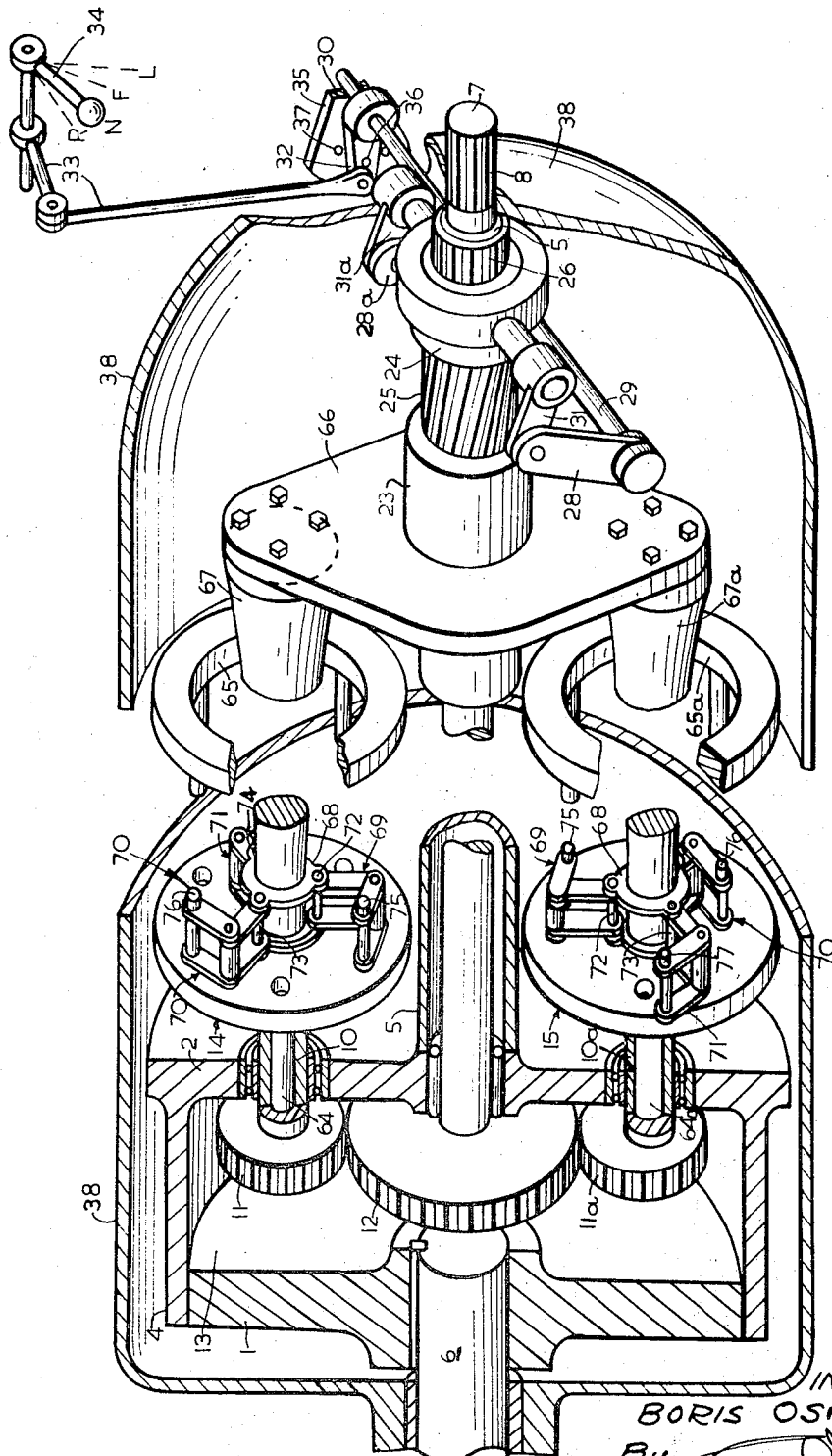
FIGURE 13 is a fragmentary perspective view partly exploded similar to FIGURE 7 but incorporating link carriers which are movable angularly relative to the sub carriers.

In the embodiment shown in FIGURE 13 the shafts 9–9a are omitted, the main planet wheels 11–11a are connected to the plates 14, 15 only of the sub carriers by tubes or short shafts 64–64a and the plates 14a, 15a of the sub carrier have a large axial bore 65–65a therein. The plate 3 of the main carrier is omitted and the gear wheel 22 is replaced by a plate 66. This is shown as an oval plate only because two gangs of out-of-balance units are illustrated. If a greater number of gangs of out-of-balance units are incorporated the plate 66 would be made circular. The plate 66 can be turned in the same manner as the gear wheel 22 and the mechanism previously described is incorporated for this purpose.

In this embodiment the plate 66 has two journal pins 67–67a fixed thereto which by movement of the plate 66 to achieve the various operating positions of the drive— in this case limited to neutral, forward and reverse—move on a circular path concentric to the output shaft 7 and across the axes of the sub carriers.

Each carrier pin 67–67a has a strap-like link carrier 68 in bearings thereon and two sets of two part articulated double links 70–71 are secured thereto by one end on journal pins 73–74 located 120° apart. The other ends of the links are secured to journal pins 76–77 fixed in and between the sub carrier plates 14–14a, 15–15a respectively on a common pitch circle. The link 69 is non-movably fixed by its pin 72 to the respective link carriers (straps) 68 and its other end is secured by journal pin 75 to the sub carrier in the same manner as the first two described links. This link 69 functions in the same manner as the radial arm 56.

The journal pins (shown as 69, 70, 71 in FIGURE 14) connecting the respective articulated links are the equivalent of and function in the same manner as the out-of-balance weights in the sub planet-sub sun wheel units and the carrier pins 67 are the equivalent of the sub sun wheels 16. To set this three link unit in neutral position the plate 66 is moved in the manner previously described until the carrier pins 67–67a are in axial alignment with the sub carriers (see FIGURE 14). For forward drive the pins 67–67a are moved to a position which is eccentric to and trailing the axes of the sub carriers in the direction of rotation of the sub carriers. For a reverse drive the pins 67–67a are moved to a corresponding position in advance of the direction of rotation of the sub carriers.

For any given design, drive ratio selection will be automatic and determined by the unit, for any output torque condition encountered.

For a wide range of input-output conditions and requirements it would be necessary only to produce one size of main planet wheel and sub planet wheels or links assemblies, complying with other requirements by a multiplicity of assemblies or arranging assemblies at various radii for different units. In addition the gear ratio of planet wheel-sun wheel components may be varied.

Two transmissions mounted "back-to-back" and driven together at the input ends may be connected to a drive wheel at each of the output shafts. Each output shaft, and wheel may be driven independently and a variable differential action provided which will tend to become a locked differential action at high input speed condition. This application would be suitable, particularly for wheeled vehicles traversing soft or muddy ground. Wheeled armoured fighting vehicles would be a good example.

The invention can be applied to the propeller shafts of ships to minimise or eliminate torsional vibration. The transmission could be designed to provide all functions including neutral and reverse, and would run for the most in the condition of "weight out" or lock position in the elements. This would prevent overspeed of the shaft under conditions where the propeller may not be completely immersed. In the lock position the predominant torque acting on each sub carrier is provided by centrifugal force acting on one weight and resisting rotation of the sub carrier with respect to the main carrier. The centrifugal force acting on two other weights balance each other and the fourth weight has low centrifugal force acting on it.

Power braking may be achieved in the case of forward drive by moving the control and hence the connector gear to reverse or partial reverse position thus causing a reverse torque to be applied to the planet wheels resulting in a reverse or braking torque on the output shaft.

In the case of an automotive application the vehicle would come to rest under the action of continued reverse or braking torque when the reverse torque must be disconnected or the vehicle would then reverse.

I claim:

1. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheels, a connector unit comprising a sub carrier operatively connected co-axially to each main planet wheel, a gang of out-of-balance weight units mounted on each sub carrier, control means to move the out-of-balance weight units angularly relative to the axes of the respective main planet wheels to establish a neutral position or to positions where on rotation of the main carrier centrifugal force developed through the out-of-balance weight units creates a forward drive or a reverse drive of the output shaft according to the angular setting position of the out-of-balance weight units.

2. A non-slip automatic infinitely variable mechanical power transmission mechanism according to claim 1 wherein the out-of-balance weight units comprise a gang of sub planet wheels mounted on journal pins fixed in each sub carrier, each said sub planet wheel having an out-of-balance weight thereon, a sub sun wheel for each gang of sub planet wheels mounted on a shaft co-axially with each main planet wheel, said out-of-balance weight units being adapted to be fixed by the control means turning the sub sun wheels in relation to the main planet wheels to determined angular setting positions.

3. A non-slip automatic infinitely variable mechanical power transmission mechanism according to claim 1 wherein the out-of-balance weight units comprise an eccentric fixed in each of the sub carriers for rotation therewith and an arrangement of articulated links connected to a strap on each eccentric and to journal pins mounted in a common pitch circle on the respective sub carriers, said out-of-balance weight units being adapted to be fixed by the control means in determined angular setting positions in relation to the main planet wheels.

4. A non-slip automatic infinitely variable mechanical power transmission mechanism according to claim 1 wherein the out-of-balance weight units each comprise an arrangement of articulated links connected to a strap and to journal pins mounted in a common pitch circle on a sub carrier, said strap being mounted in a bearing on a journal pin, said control means being arranged to move and hold the strap journal pin in determined angular setting positions in relation to a main planet wheel.

5. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheels, a connector unit comprising a sub carrier operatively connected co-axially to each main planet wheel, a gang of out-of-balance weight units mounted on each sub carrier, control means to move the out-of-balance weight units angularly relative to the axes of the respective main planet wheels to establish a neutral position or to positions where on rotation of the main carrier centrifugal force developed through the out-of-balance weight units creates a forward drive or a reverse drive of the output shaft according to the angular setting position of the out-of-balance weight units, said control means comprising a pinion fixed one on each of a number of shafts corresponding to the number of main planet wheels in a gang, said shafts being in axial alignment with the respective planet wheels, a large gear concentric with the main carrier and in engagement with the pinions, said large gear having a hub with helical running splines therein, a member mounted for longitudinal movement with respect to the main carrier and rotatable axially therewith, said member having splines thereon in engagement with the splines in the hub of the large gear, means to move said member longitudinally thereby turning the large gear, and consequently the angular setting position of the gangs of out-of-balance weight units relative to the respective main planet wheels and means to hold the said member in a selected position.

6. A non-slip automatic infinitely variable mechanical power transmission mechanism according to claim 5 wherein the member mounted for longitudinal movement with respect to the main carrier is a sleeve mounted on the output shaft, and the means to move the sleeve longitudinally comprise a hand lever having its work end connected through cranks and links to said sleeve.

7. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheels, a connector unit comprising a sub carrier operatively connected co-axially to each main planet wheel, a gang of out-of-balance weight units each comprising an arrangement of articulated links connected to a strap and to journal pins mounted in a common pitch circle on a sub carrier, said strap being mounted in a bearing on a journal pin, control means arranged to move and hold the strap journal pin in determined angular setting positions in relation to a main planet wheel.

8. A non-slip automatic infinitely variable mechanical power transmission mechanism according to claim 7 wherein control means to move the out-of-balance weight units angularly relative to the respective main planet wheels comprises, a sleeve mounted for longitudinal movement on the output shaft and rotatable therewith, said sleeve having helical running splines thereon, a member having a hub with helical splines therein mounted on said sleeve and in engagement with the splines thereon, said member having the journal pins for the straps located in parallel spaced relationship and projecting into the sub carriers.

9. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheels, a connector unit comprising a sub carrier operatively connected co-axially to each main planet wheel, a gang of out-of-balance weight units mounted on each sub carrier, said out-of-balance weight units each consisting of a gang of sub planet wheels mounted on journal pins fixed in each sub carrier, each sub planet wheel having a hub with a segmental part cut away between an end collar-forming part and the sub planet wheels, a sub sun wheel for each gang of sub planet wheels mounted on a shaft co-axially with each main planet wheel, control means to turn the sub planet wheels angularly relative to the axes of the respective main planet wheels to establish a neutral position or to positions where on rotation of the main carrier centrifugal force developed through the out-of-balance weight units creates a forward drive or a reverse drive of the output shaft according to the angular setting position of the sub planet wheels.

10. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheels, a connector unit comprising a sub carrier operatively connected co-axially to each main planet wheel, a gang of out-of-balance weight units comprising an eccentric fixed in each of the sub carriers, a strap on each eccentric and three sets of two part articulated double links secured by one end to journal pins on each strap at 90° apart and a fourth non-articulated link secured by one end to a journal pin on a radial arm fixed to and projecting from each strap at the fourth 90° position, the other ends of all said links being secured by journal pins to the respective sub carriers on a common pitch circlie, control means to move the out-of-balance weight units angularly relative to the axes of the respective main planet wheels to establish a neutral position or to positions where on rotation of the main carrier centrifugal force developed through the out-of-balance weight units creates a forward drive or a reverse drive of the output shaft according to the angular setting position of the out-of-balance weight units.

11. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheels, a connector unit comprising a sub carrier operatively connected co-axially to each main planet wheel, a gang of out-of-balance weight units comprising two sets of two part articulated double links secured by one end to journal pins on a strap mounted in a bearing on a journal pin, the other ends of said links being secured by journal pins to the respective sub carriers on a common pitch circle and a third articulated double link non-movably fixed by one part to said strap and at the other end by a journal pin to each sub carrier on the same common pitch circle, all said links being located 120° apart, control means to move and hold the strap journal pin angularly relative to the axes of the respective main planet wheels to establish a neutral position or to positions where on rotation of the main carrier centrifugal force developed through the out-of-blance weight units creates a forward drive or a reverse drive of the output shaft according to the angular setting position of the out-of-balance weight units.

12. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheel, a connector unit comprising a sub carrier operatively connected co-axially to each main planet wheel, a gang of out-of-balance weight units mounted on each sub carrier, said out-of-balance weight units each consisting of a gang of sub planet wheels mounted on journal pins fixed in each sub carrier, each sub planet wheel having a hub with a segmental part cut away between an end collar-forming part and the sub planet wheels, the radius of said out-of-balance weights formed by said segmental cuts being equal to or greater than the pitch circle radius of the sub planet wheels, a sub sun wheel for each gang of sub planet wheels mounted on a shaft co-axially with each main planet wheel, control means to turn the sub planet wheels angularly relative to the axes of the respective main planet wheels to establish a neutral position or to positions where on rotation of the main carrier centrifugal force developed through the out-of-balance weight units creates a forward drive or a reverse drive of the output shaft according to the angular setting position of the sub planet wheels.

13. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheels, a connector unit comprising a sub carrier operatively connected co-axially to each main planet wheel, a gang of out-of-balance weight units consisting of an eccentric fixed on each of the sub carriers for rotation therewith, a strap on each eccentric, three sets of two part articulated double links secured by one end to journal pins on the strap at 90° apart and a fourth non-articulated link secured by one end to a journal pin on a radial arm fixed to and projecting from the strap at the fourth 90° position, the other ends of all said links being secured by journal pins to each sub carrier on a common pitch circle, each said link being of the same or approximately the same length, and when placed in straight alignment radially in relation to their respective sub carriers the projection of each link unit from its mounting point on its strap is approximately twice the pitch circle radius of the pivot point to the sub carrier, control means to move the out-of-balance weight units angularly relative to the axes of the respective main planet wheels to establish a neutral position or to positions where on rotation of the main carrier centrifugal force developed through the out-of-balance weight units creates a forward drive or a reverse drive of the output shaft according to the angular setting position of the out-of-balance weight units.

14. A non-slip automatic infinitely variable mechanical power transmission mechanism comprising a main carrier connected to a power input shaft for balanced rotation therewith, a gang of main planet wheels rotatable on axes on a common pitch circle in the main carrier and rotatable with the main carrier, an output shaft arranged axially with the main carrier, a sun wheel fixed on the output shaft and engaging the main planet wheels, a connector unit comprising a sub carrier operatively connected co-axially to each main planet wheel, a gang of out-of-balance weight units mounted on each sub carrier, said out-of-balance weight units consisting of an arrangement of articulated links connected to a strap and to journal pins mounted in a common pitch circle on a sub carrier, said strap being mounted in a bearing on a journal pin, said arrangement of articulated links each comprising two sets of two part articulated double links secured by one end to journal pins on said strap, the other ends of said links being secured by journal pins to each sub-carrier on a common pitch circle and a third articulated double link non-movably fixed by one link part to the strap and at the other end by a journal pin to each sub carrier on the same common pitch circle, all said links being located 120° apart, each said link being of the same or approximately the same length and when placed in straight alignment radially in relation to their respective sub carriers the projection of each link unit from its mounting point on its strap is approximately twice the pitch circle radius of the pivot point to the sub carrier, control means to move the out-of-blance weight units angularly relative to the axes of the respective main planet wheels to establish a neutral position or to positions where on rotation of the main carrier centrifugal force developed through the out-of-balance weight units creates a forward drive or a reverse drive of the output shaft according to the angular setting position of the out-of-balance weight units.

References Cited

UNITED STATES PATENTS

| | | | |
|---|---|---|---|
| 1,632,694 | 6/1927 | Coleman | 74—751 |
| 1,680,899 | 8/1928 | McCall | 74—751 |
| 1,685,371 | 9/1928 | Nichols | 74—751 |
| 1,839,571 | 1/1932 | McCall | 74—751 |
| 1,983,916 | 12/1934 | McGill | 74—752 |

DONLEY J. STOCKING, *Primary Examiner.*

DON A. WAITE, DAVID J. WILLIAMOWSKY, MARK NEWMAN, *Examiners.*

T. C. PERRY, *Assistant Examiner.*